United States Patent
Pursifull et al.

(10) Patent No.: US 10,549,756 B2
(45) Date of Patent: Feb. 4, 2020

(54) AUTOMATIC BRAKE HOLD RELEASE DIRECTLY TO VEHICLE CREEP

(71) Applicant: FORD GLOBAL TECHNOLOGIES, LLC, Dearborn, MI (US)

(72) Inventors: Ross D. Pursifull, Dearborn, MI (US); Moses A. Fridman, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 267 days.

(21) Appl. No.: 15/873,220

(22) Filed: Jan. 17, 2018

(65) Prior Publication Data
US 2019/0217862 A1 Jul. 18, 2019

(51) Int. Cl.
| B60W 30/18 | (2012.01) |
| B60T 7/12 | (2006.01) |
| B60W 10/06 | (2006.01) |
| B60W 10/184 | (2012.01) |

(52) U.S. Cl.
CPC ......... B60W 30/18063 (2013.01); B60T 7/12 (2013.01); B60T 7/122 (2013.01); B60W 10/06 (2013.01); B60W 10/184 (2013.01); B60W 30/18018 (2013.01); B60W 30/18109 (2013.01); B60T 2201/04 (2013.01); B60W 2540/10 (2013.01); B60W 2540/12 (2013.01)

(58) Field of Classification Search
CPC combination set(s) only.
See application file for complete search history.

(56) References Cited

U.S. PATENT DOCUMENTS

| 7,909,730 | B2 | 3/2011 | Schwartz et al. |
| 9,731,722 | B2 | 8/2017 | Khafagy et al. |
| 2017/0072943 | A1 | 3/2017 | Pedlar et al. |
| 2018/0306128 | A1* | 10/2018 | Okitsu ............... F02D 29/02 |
| 2019/0135130 | A1* | 5/2019 | Hornischer ......... B60L 15/2063 |

FOREIGN PATENT DOCUMENTS

| CN | 201800700 U | 4/2011 |
| DE | 102016201664 A1 | 3/2017 |
| KR | 1020160149740 | 12/2016 |

* cited by examiner

*Primary Examiner* — Derek D Knight
(74) *Attorney, Agent, or Firm* — Raymond L. Coppiellie

(57) ABSTRACT

A transportation vehicle provides a brake autohold function to maintain braking without requiring the driver to continuously apply pressure on a brake pedal. The vehicle comprises an autohold selector, a parking brake selector, a brake pedal, and an accelerator pedal. A braking system is adapted to enter an autohold event according to a pressed brake pedal at vehicle standstill during an active autohold mode toggled by the autohold selector. A controller is configured to terminate the autohold event in response to either a deactivation command using the parking brake selector or accelerator pedal movement, without deactivating the autohold mode. By manually terminating the brake autohold event the vehicle can begin to creep forward using only the torque generated by the engine at idle, thereby avoiding the additional torque that is generated when the accelerator pedal is used to terminate the brake autohold event.

10 Claims, 6 Drawing Sheets

AUTOMATIC BRAKE HOLD RELEASE DIRECTLY TO VEHICLE CREEP

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to an automatic brake hold wherein application of the brakes can be maintained automatically after a vehicle operator brakes the vehicle to a stop, and, more specifically, to the manner of terminating an individual brake autohold event without canceling the brake hold function itself.

An automatic braking feature for motor vehicles has been introduced known by the terms automatic vehicle hold (AVH), automatic brake hold, or brake autohold. A driver-controlled switch determines whether the feature is active. When active, a controller monitors vehicle movement. When the vehicle brakes to a stop (with the feature active) and the driver releases the brake pedal, brake pressure is automatically held to keep the vehicle at a stop. When the driver takes action to resume motion (e.g., pressing the accelerator pedal), the brake torque is released so that full control is restored to the driver. Driver fatigue is reduced since the need for continued pressure on the brake pedal during a long stop is eliminated. The typical method used for releasing the held brake pressure is to have the driver press on the accelerator pedal. During most situations, the transmission selector remains in the Drive position. A preferred type of operation of brake autohold when the transmission selector is in the Reverse position is disclosed in U.S. application Ser. No. 14/527,949, filed Oct. 30, 2014, entitled "Automatic Brake Hold With Low Speed Maneuverability," incorporated herein by reference.

A typical braking system (such as an antilock braking system, or ABS) may include hydraulic and/or electronically controlled actuators to supply brake pressure to selected vehicle wheels. A hydraulic circuit converting movement of the brake pedal into a brake pressure is easily configured to operate automatically for providing the brake autohold feature. Electric actuators are particularly useful in connection with implementing a parking brake function since they can be constructed such that no energy is required to maintain brake pressure once the actuator becomes fully engaged.

When both types of actuators are present and when a brake autohold event continues for a long period of time, a brake controller may automatically switch from hydraulic actuation to electric actuation in order to reduce energy use. This may be especially beneficial in a vehicle having an engine auto stop/start function, wherein the internal combustion engine may be briefly shut down (by stopping combustion) during a stop of reduce use of fuel, since the engine cannot then supply energy to support the brake actuation.

In vehicles with automatic transmissions, when the vehicle is at a standstill with the brake applied the engine continues to operate at idle (unless there is an engine auto stop event) and a small amount of torque is applied to the transmission. Without brake autohold, when the driver releases the brake pedal then the vehicle is able to creep at a slow speed in response to the idle torque. Creeping is very useful to the driver in certain situations. In particular, the vehicle can be moved slightly without having to operate the accelerator pedal (i.e., the foot can remain positioned at the brake pedal).

When a conventional brake autohold system is engaged, it may be more difficult to utilize the creep torque since the typical manner of ending the brake autohold event is to press down on the accelerator pedal. Movement of the accelerator pedal simultaneously causes an increase in the engine throttle so that addition engine torque is applied to the transmission. Thus, the vehicle may accelerate faster or less smoothly than compared with a conventional brake release. The driver could press the Brake Autohold selector switch on the instrument panel to end the brake autohold event, but that may be undesirable because this also results in the Brake Auto Hold Mode being turned off, so the selector switch would have to be pressed again in order to obtain an automatic brake hold during the next vehicle stop.

SUMMARY OF THE INVENTION

In one aspect of the invention, a vehicle comprises an autohold selector, a parking brake selector, a brake pedal, and an accelerator pedal. A braking system is adapted to enter an autohold event according to a pressed brake pedal at vehicle standstill during an active autohold mode toggled by the autohold selector. A controller is configured to terminate the autohold event in response to either a deactivation command using the parking brake selector or accelerator pedal movement, without deactivating the autohold mode.

DETAILED DESCRIPTION OF PREFERRED EMBODIMENTS

Figure 1:
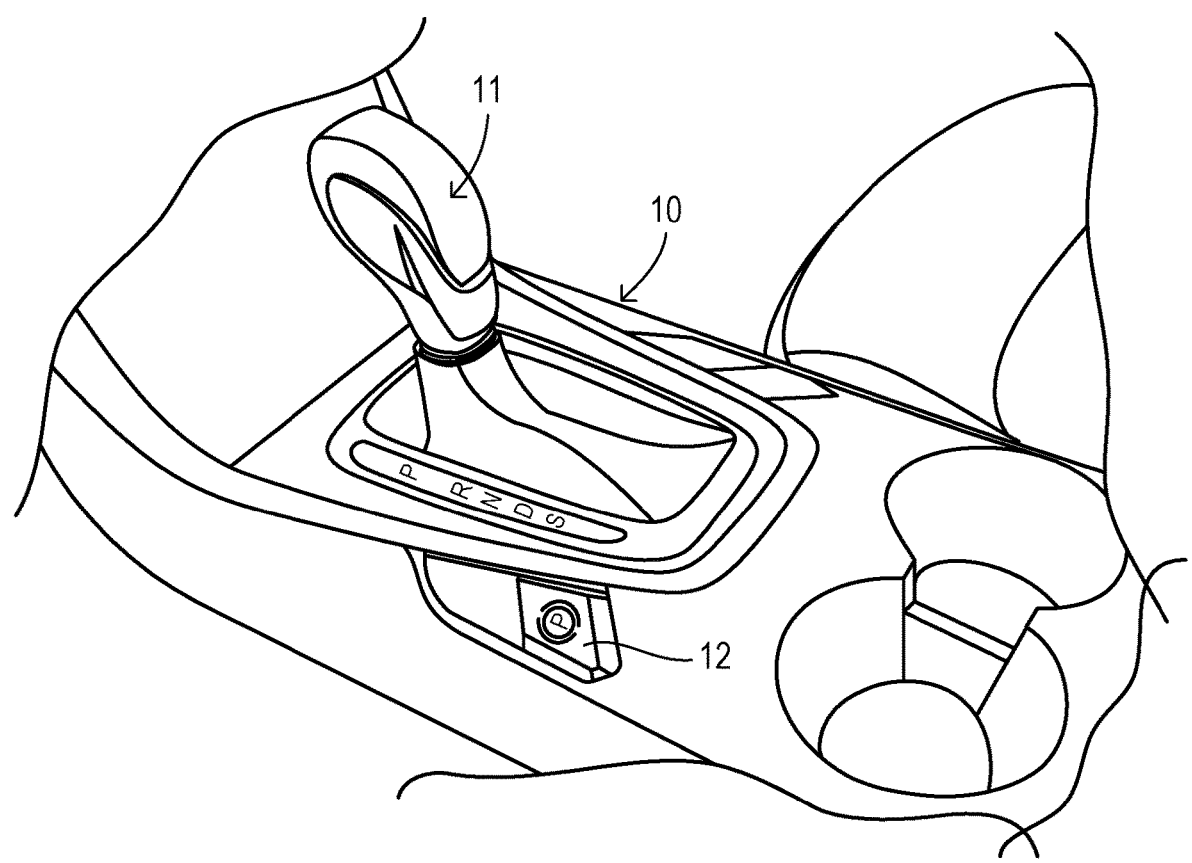
FIG. 1 is a perspective view of vehicle console controls including an electric parking brake switch.

FIG. 1 shows a center console 10 in a vehicle interior for supporting a transmission shifter 11 and an electric parking brake (EPB) selector switch 12. For example, switch 12 may be a bidirectional, momentary contact switch arranged as a lever which pivots up or down in order to manually create On and Off command signals, respectively. In addition controlling long term application when the vehicle is parked by moving switch 12 up and down, some vehicles may also support use of the electric parking brake during emergencies while the vehicle is moving. While placement on center console 10 is shown, any other placement within reach of the driver can also be used.

Figure 2:
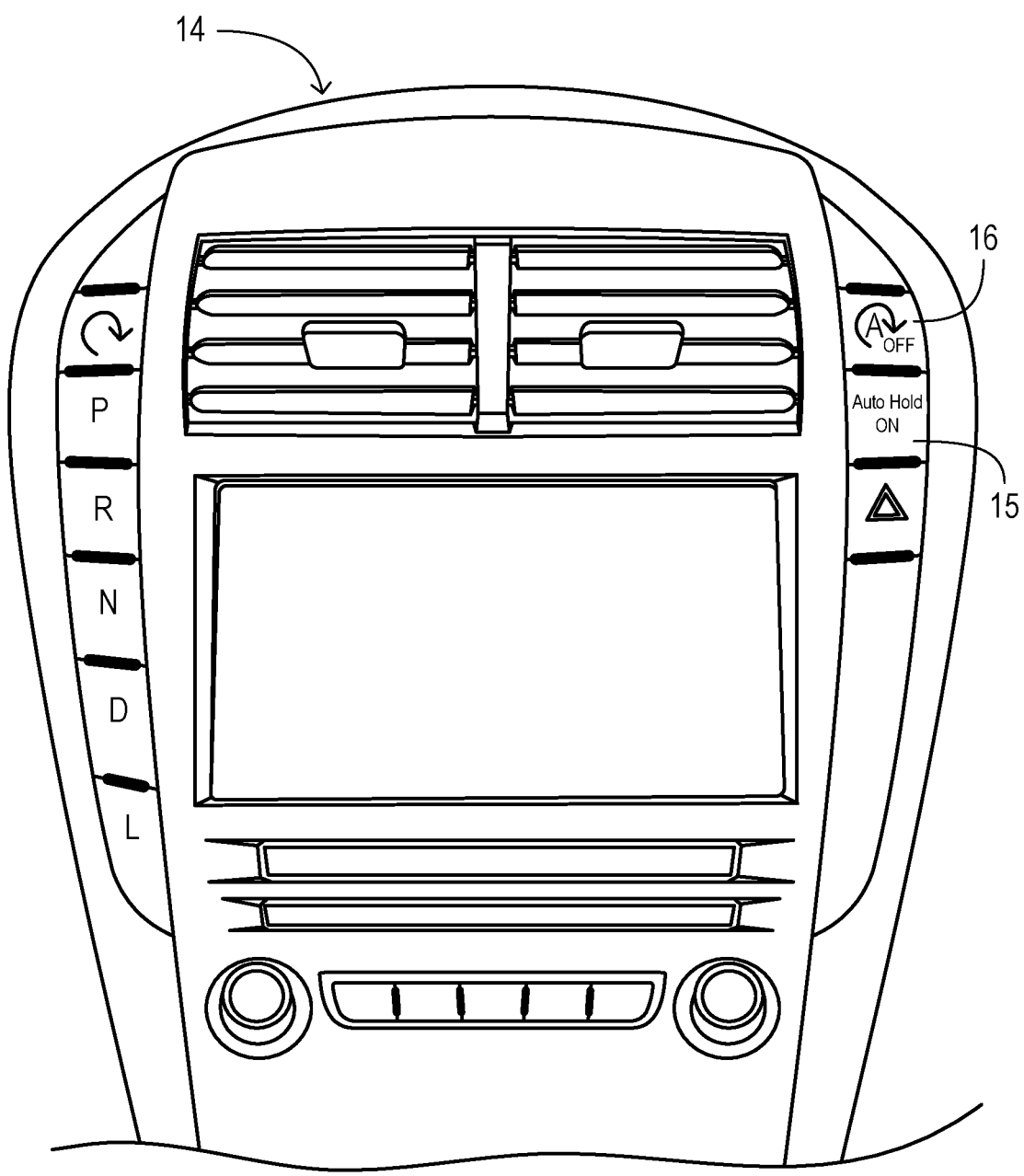
FIG. 2 is a plan view of a vehicle control panel including selector switches for Brake Autohold, Engine Autostop, and other functions.

FIG. 2 shows a dashboard control panel 14 as another location for various driver controls as part of a human-machine interface (HMI) also including a touchscreen display and components of climate control and audio entertainment systems. A brake auto hold selector 15 may preferably be comprised of a momentary contact switch with backlit indicator light(s) for showing whether a brake autohold mode is in an ON state or an OFF state for automatically entering individual brake autohold events based on vehicle operating conditions and for indicating whether an individual brake hold event is in progress (e.g., by blinking the indicator light). Activation of the brake autohold mode may typically require predetermined conditions to be satisfied, such as the vehicle door(s) being closed and the driver's seatbelt being fastened.

Figure 3:
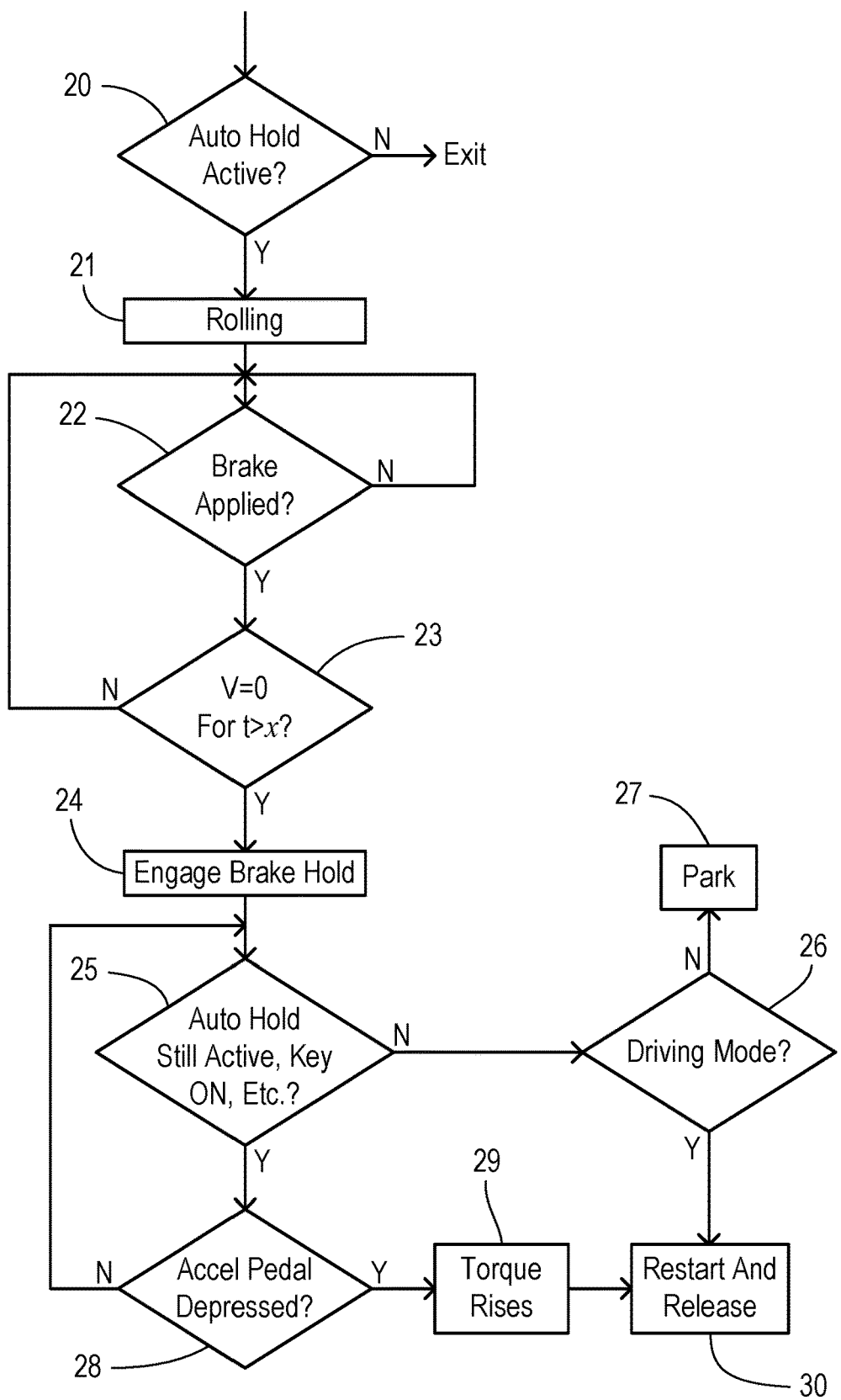
FIG. 3 is a flowchart showing a prior art method for implementing a brake autohold feature.

Referring now to FIG. 3, a conventional automatic brake hold method is shown. In step 20, a check is performed to determine whether Brake Auto Hold mode is active. If not, then the method is exited. If active, then the method monitors for a rolling condition of the vehicle (i.e., vehicle speed v is greater than zero) at step 21. While rolling, a check is performed in step 22 to determine whether the brake is being applied (i.e., brake pedal is pressed). If so, then a check is periodically performed in step 23 to determine whether the vehicle has reached a standstill (i.e., velocity v has dropped to zero). In addition, the check in step 23 may preferably include the condition that the standstill persists for a predetermined time period x with the brake continuing to be applied before entering a brake hold event (e.g., automatically engaging the brakes by activating a hydraulic pump to generate brake pressure) in step 24.

After a brake hold event is entered, the method checks to determine whether the event should be ended. A check is performed in step 25 to determine whether the necessary conditions persist to support a valid brake autohold event, such as the Brake Hold mode has not been turned off via the selector switch, the ignition key is in the ON position, the driver's door is closed, etc. If the Brake Hold mode is no longer valid in step 25, then a check is performed in step 26 to determine whether the vehicle is in a driving mode (i.e., driver is buckled in, door is closed, etc.). If not, then instead of merely releasing the automatic brake pressure the vehicle automatically transitions to a parked state (e.g., shifting the transmission into Park). If still in driving mode (e.g., if the Brake Auto Hold mode was turned off via the selector switch) then the brake autohold event ends and brake pressure is released in step 30. If an engine auto stop event was also in progress then the engine is also restarted in step 30.

When the driver is ready to continue movement of the vehicle in the prior art method, the accelerator pedal is pressed. With the Auto Hold mode still being active in step 25, a check is then performed in step 28 to determine whether the accelerator has been depressed. If not, then a return is made to step 25. If it is, then the accelerator pedal movement results in a corresponding rise in the torque output of the vehicle's engine applied to the transmission in step 29. Also resulting from the movement of the accelerator pedal, the brakes are released and the brake autohold event ends in step 30. However, the torque then being applied to the vehicle wheels may be somewhat larger than the creep torque.

Figure 4:
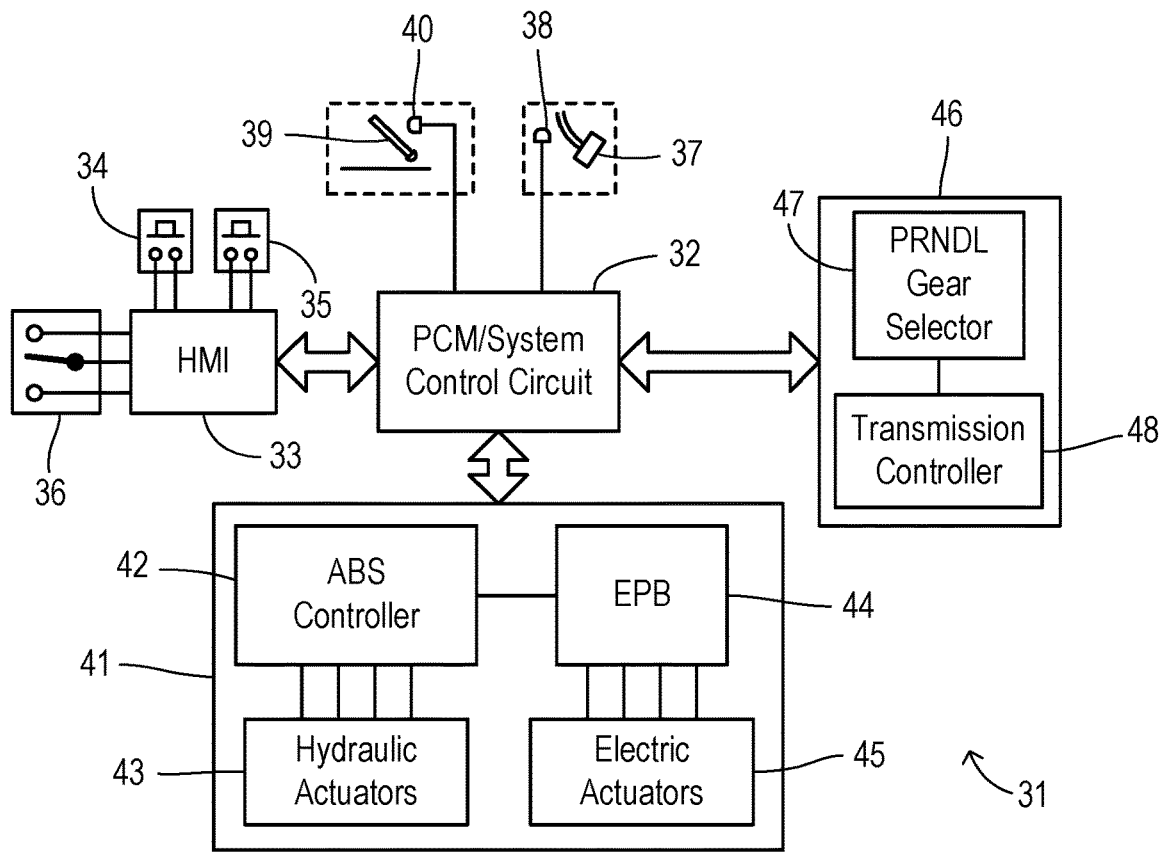
FIG. 4 is a block diagram showing one preferred embodiment of a vehicle system for implementing the present invention.

FIG. 4 shows a system block diagram for one preferred embodiment implementing the present invention. A vehicle system 31 is based on a control circuit 32 which may be included in a powertrain control module (PCM) or a main system controller module, for example. Control circuit 32 may be located within one module or distributed among several electronic modules within a vehicle. A human machine interface (HMI) module 33 is coupled with a Brake Autohold selector switch 34 (e.g., a momentary-contact membrane switch) to generate switch pulses for commanding an ON state or an OFF state of a Brake Autohold mode in control circuit 32. An engine auto stop selector switch 35 is connected to HMI module 33 to provide switch pulses for commanding ON or OFF states of an Engine Auto Stop/Start mode maintained in control circuit 32. In addition, a parking brake selector switch 36 is connected to HMI module 33 for generating switch pulses to toggle an electric parking brake actuator between its ON and OFF states. Switch 36 may be comprised of a dual-acting toggle lever that can be moved either upward or downward to generate manual activation and deactivation commands, respectively.

A brake pedal 37 has an associated brake position sensor 38 coupled to control circuit 32 for detecting when the brake pedal is being depressed. An accelerator pedal 39 has a position sensor 40 coupled to control circuit 32 for indicating when accelerator pedal 39 is being depressed.

A brake system 41 is coupled with control circuit 32 to receive various commands, including an autohold command to automatically provide brake pressure in a known manner. In this example, an anti-lock brake system (ABS) controller 42 is coupled to hydraulic actuators 43 for maintaining automatic hydraulic application of a brake torque to keep the vehicle at a standstill. ABS Controller 42 may also be coupled to an EPB 44 in brake system 41 with corresponding electric actuators 45 for electronically maintaining the brake pressure (e.g., if an autohold event extends over a longer period of time). Control circuit 32 may receive a vehicle speed signal v from ABS controller 42, or may monitor the vehicle speed using other sensors as known in the art.

A transmission system 46 includes a gear selector 47 and a transmission controller 48 as known in the art. Gear selector 47 may be comprised of a shift lever which is manually controlled between different positions including Park, Reverse, Neutral, and forward gear selections including Drive and Low. The corresponding position of gear selector 47 is provided from transmission system 46 to control circuit 32.

Control circuit 32 further controls operation of an internal combustion engine (not shown), including the automatic stopping of the engine during some occurrences of a vehicle standstill as known in the art. An ON or OFF state of the engine auto stop function is set in response to manual manipulation of selector switch 35. After an engine auto stop event is entered, pressing on accelerator pedal 39 is sensed by motion sensor 40 and results in automatic restarting of combustion in the engine.

Figure 5:
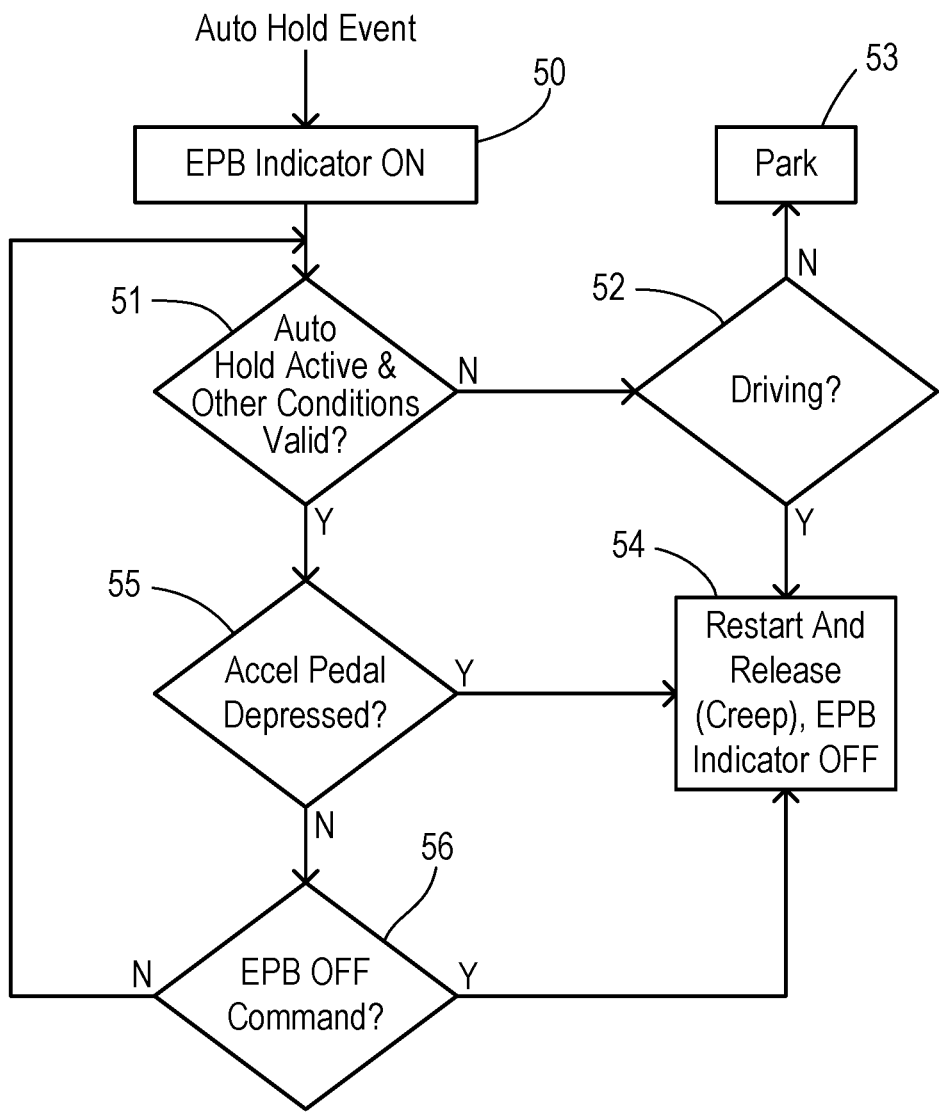
FIG. 5 is a flowchart showing one preferred method of the invention.

A main feature of the invention is the ability to terminate a brake auto hold event without requiring movement of the accelerator pedal and without deactivating the Brake Auto Hold mode itself. Thus, the parking brake selector is repurposed to provide a deactivation command that affects only a current brake hold event. A preferred method of the invention in FIG. 5 is shown wherein a brake auto hold event is in progress. In step 50, an indicator light associated with the parking brake selector switch may optionally be illuminated as a possible reminder that a manual brake deactivation command made with the parking brake selector switch can be used to terminate the brake auto hold event. In step 51, periodic checks are made to confirm whether all qualifying conditions for the Brake Auto Hold function are satisfied (such as the Brake Hold mode switch being "ON," the door closed, and the driver wearing a seatbelt). If not confirmed, then a check is performed to determine whether the vehicle is in a driving mode in step 52. If not in driving mode then the vehicle enters a Parked state in step 53, and if in driving mode then the brake hold is released in step 54.

While the qualifying conditions remain valid, a check is performed in step 55 to determine whether the accelerator pedal is pressed (i.e., the conventional action which ends a Brake Autohold event). When the accelerator pedal is pressed, then engine combustion is restarted (if there is an Engine Auto Stop event) and the Brake Auto Hold event is terminated so that braking force from the brake actuator is removed, thereby allowing the vehicle to creep. If the EPB indicator light was illuminated in step 50 then it is turned off in step 54.

If the accelerator pedal is not pressed, then a check is performed in step 56 to determine whether a deactivation command via the parking brake selector switch has been manually initiated. In response to the detecting the deactivation command, engine combustion is restarted (if there is an Engine Auto Stop event) and the Brake Auto Hold event is terminated in step 54. Thus, availability of creeping torque is obtained directly via the deactivation command without any increase in the engine throttle that would otherwise be triggered by using the accelerator pedal. Use of the electric parking brake switch in this invention is very beneficial and easily accepted by the driver since its primary purpose is also related to the braking function and is already conveniently located for access by the driver. The secondary, supplemental use of the EPB switch during brake autohold events is configured such that there is no impact on the functioning of the EPB switch in connection with the parking brake function.

Figure 6:
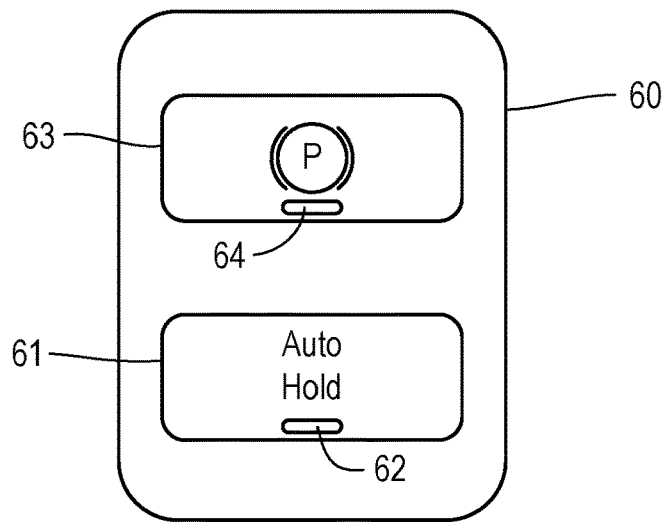
FIG. 6 is a plan view showing selector switches and indicator lights useful in an embodiment of the invention.

FIG. 6 shows an alternative arrangement for a set of operator controls 60 including a Brake Auto Hold switch 61 and an Electric Park Brake (EPB) switch 63, which preferably comprise momentary-contact pushbutton switches to toggle between active/inactive states. Indicator lights 62 and 64 on switches 62 and 63, respectively, may be used to indicate the active/inactive state of each function. Brake Hold indicator 62 may illuminate with different colors to inform the driver whether the Brake Auto Hold state is on (i.e., armed) and whether an actual brake autohold event is in progress (i.e., brakes being automatically applied), for example. During a brake autohold event, EPB indicator 64 may illuminate in a manner that informs the driver that pressing EPB switch 63 will cancel the pending brake autohold event.

Figure 7:
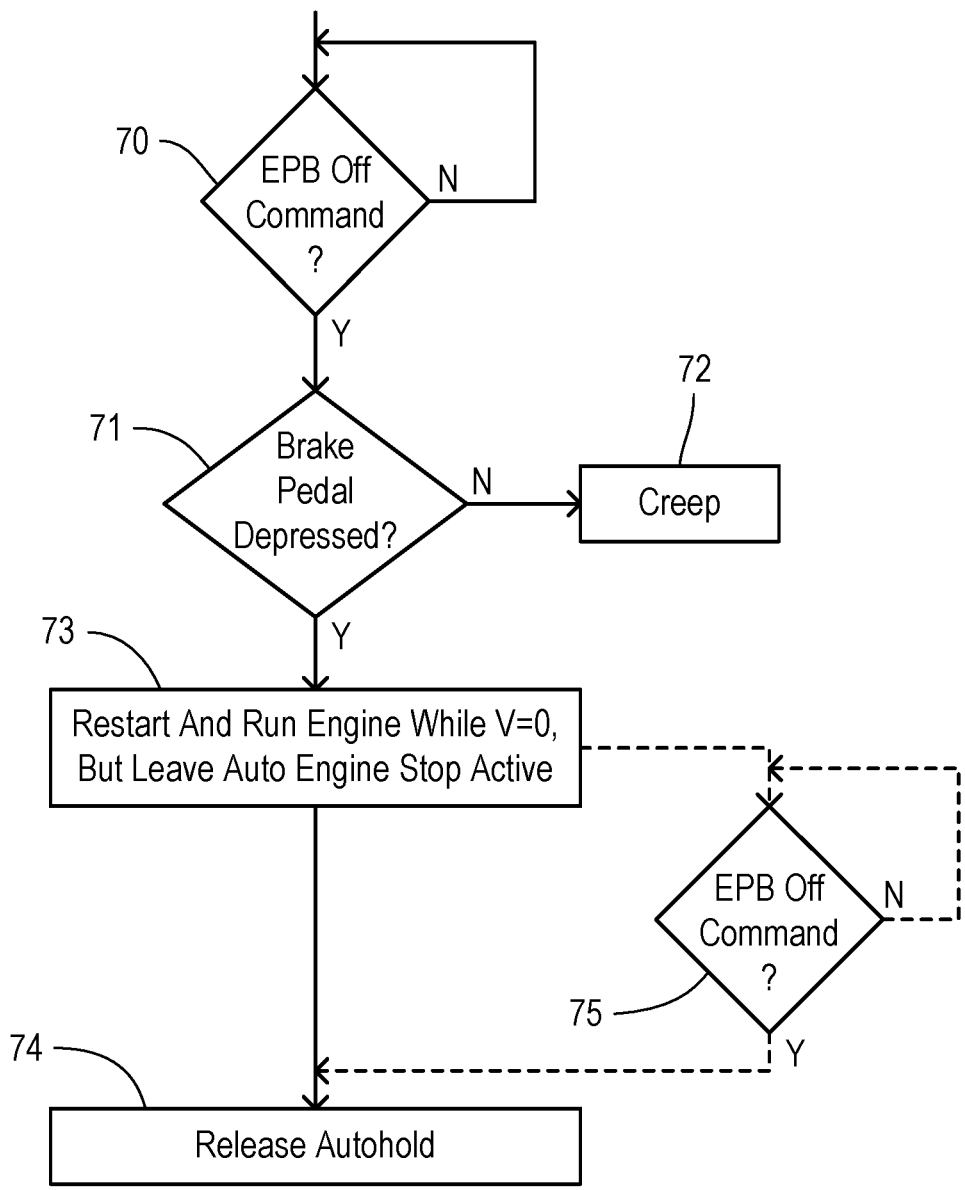
FIG. 7 is a flowchart showing another preferred embodiment of a method of the invention.

As stated above, in a vehicle with both a Brake Auto Hold function and an Engine Auto Stop/Start function, the termination of an individual brake autohold event would also terminate any pending engine auto stop event so that creep torque becomes instantly available to the driver. FIG. 7 shows another embodiment of a method of the invention wherein the EPB selector switch performs another supplemental function wherein individual engine auto stop events can be manually terminated without having to fully deactivate the Engine Auto Stop/Start mode. In particular, the actions shown in FIG. 7 can be substituted for step 56 in FIG. 5. Thus, step 70 represents the periodic checking for a deactivation command via the EPB selector switch during a pending brake autohold event. Once the deactivation command is detected, a check is performed in step 71 to determine whether the driver is depressing the brake pedal (because the act of pressing the brake pedal indicates that the driver is not then attempting to creep the vehicle). If the brake pedal is not pressed, then engine combustion is restarted (if there is an engine auto stop event) and the brake auto hold event is terminated so that the vehicle can creep in step 72. If the brake pedal is pressed, then the deactivation command is acted upon by restarting the engine (even though the vehicle remains at standstill). This allows the driver the option to terminate the current engine auto stop event without deactivating the Engine Auto Stop mode for future standstill events (or if the engine has not yet stopped then to prevent an engine auto stop event for the current standstill event). Since the driver is maintaining manual braking pressure, in one embodiment the brake autohold event may also be terminated in step 74. In another alternative embodiment, termination of the brake autohold event may require another deactivation command via the EPB selector switch in optional step 75 (or activation of the accelerator pedal).

What is claimed is:

1. A vehicle comprising:
   an autohold selector;
   a parking brake selector;
   a brake pedal:
   an accelerator pedal;
   a braking system adapted to enter an autohold event according to a pressed brake pedal at vehicle standstill during an active autohold mode toggled by the autohold selector; and
   a controller configured to terminate the autohold event in response to either a deactivation command using the parking brake selector or accelerator pedal movement, without deactivating the autohold mode.

2. The vehicle of claim 1 wherein the braking system comprises an electric parking brake actuator adapted to be manually actuated and deactuated via the parking brake selector, and wherein the parking brake selector comprises a contact switch and an indicator light.

3. The vehicle of claim 2 wherein the contact switch is comprised of a momentary contact switch for generating a switch pulse, wherein the switch pulse toggles between an ON state and an OFF state of the electric parking brake actuator when the vehicle is parked, and wherein the switch pulse provides the deactivation command during the autohold event.

4. The vehicle of claim 1 further comprising:
   an internal combustion engine with an engine auto stop function wherein combustion is automatically discontinued during an auto stop event and automatically restarted at the end of the auto stop event;
   wherein if an auto stop event exists simultaneously with the brake autohold event, then the deactivation command terminates both the brake autohold event and the engine auto stop event.

5. The vehicle of claim 1 further comprising:
   an internal combustion engine with an engine auto stop function wherein combustion is automatically discontinued during an auto stop event and automatically restarted at the end of the auto stop event;
   wherein if the deactivation command is generated using the parking brake selector during an engine auto stop event, then A) if the brake pedal is not pressed then both the brake autohold event and the engine auto stop event are terminated, or B) if the brake pedal is pressed then the engine auto stop event is terminated without immediately terminating the brake autohold event.

6. A method of automatic brake hold for a vehicle comprising:

manually activating an autohold mode using an autohold switch;

automatically initiating a brake hold event when the autohold mode is activated and a vehicle speed drops to zero with a brake pedal being pressed;

terminating the brake hold event without deactivating the autohold mode in response to either a manual deactivation command using a parking brake switch or movement of an accelerator pedal.

7. The method of claim 6 further comprising:

manually activating an engine auto stop mode using an auto stop switch;

automatically initiating an engine stop event when the auto stop mode is activated and the vehicle is at a predetermined standstill, wherein combustion in an internal combustion engine is automatically discontinued during the engine stop event;

wherein if the engine auto stop event exists simultaneously with the brake hold event, then the manual deactivation command terminates both the brake hold event and the engine auto stop event.

8. The method of claim 6 further comprising:

manually activating an engine auto stop mode using an auto stop switch;

automatically initiating an engine stop event when the engine auto stop mode is activated and the vehicle is at a predetermined standstill, wherein combustion in an internal combustion engine is automatically discontinued during the engine stop event;

wherein if a manual deactivation command is generated using the parking brake switch during the engine stop event, then A) if the brake pedal is not pressed then both the brake hold event and the engine auto stop event are terminated, or B) if the brake pedal is pressed then the engine stop event is terminated without immediately terminating the brake hold event.

9. The method of claim 6 wherein the vehicle includes a braking system comprising an electric parking brake actuator adapted to be manually actuated and deactuated via the parking brake switch, wherein the parking brake switch comprises a contact switch, and wherein the vehicle includes an indicator light associated with the contact switch.

10. The method of claim 9 wherein the contact switch is comprised of a momentary contact switch for generating a switch pulse, wherein the switch pulse toggles between an ON state and an OFF state of the electric parking brake actuator when the vehicle is parked, and wherein the switch pulse provides the manual deactivation command during the brake hold event.

* * * * *